Figure 1:
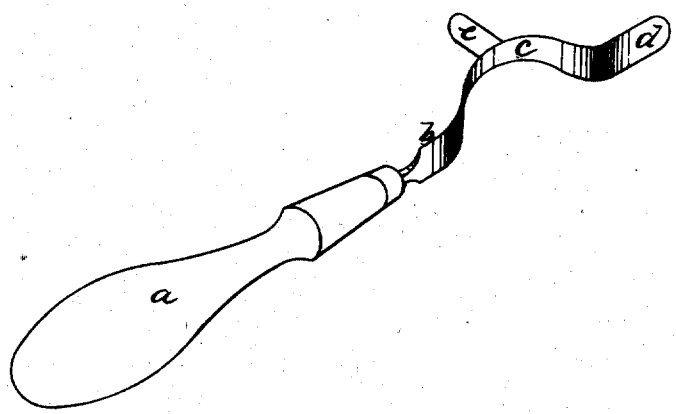

G. W. STEVENS.
Fruit-Knives.

No. 137,501. Patented April 1, 1873.

Witnesses
J. L. Boone
C. M. Richardson

Inventor
George W. Stevens
per Dewey & Co.
Attys

UNITED STATES PATENT OFFICE.

GEORGE W. STEVENS, OF SAN FRANCISCO, CALIFORNIA.

IMPROVEMENT IN FRUIT-KNIVES.

Specification forming part of Letters Patent No. 137,501, dated April 1, 1873; application filed September 20, 1872.

*To all whom it may concern:*

Be it known that I, GEORGE W. STEVENS, of San Francisco city and county, State of California, have invented an Improved Fruit-Knife; and I do hereby declare the following description and accompanying drawing are sufficient to enable any person skilled in the art or science to which it most nearly appertains to make and use my said invention or improvement without further invention or experiment.

My invention relates to an improved knife for cutting into quarters and coring fruit and separating the pits or stones from such fruits as have them, and for other purposes. My invention consists in a novel construction of a knife having a semicircular cutter, in combination with three straight sections, which are placed radially to the curve. The knife is provided with a cutting-edge on both sides.

Referring to the accompanying drawing, Figure 1 is a view of my improved knife.

The knife is usually made of thin steel and fitted into a suitable handle, $a$. The portion of the blade nearest the handle is made straight, as at $b$, having sufficient length to reach to the pit of the fruit. From this point the knife curves, as at $c$, and this portion encircles the pit or stone. Another straight section, $d$, in a line with the section $b$, runs from the outer point of the curve portion $c$, and a third straight blade or portion of a blade, $e$, is made to project at or about right angles to the line of the straight sections $b$ and $d$. The knife on being passed through the fruit cuts out the pit with the curved portion, and slices the fruit with the straight sections. We are aware that the knife with curve $c$ is old; but

Having thus described my invention, what I claim as new, and desire to secure by Letters Patent, is—

A fruit-knife constructed with a portion of the blade curved, and having three or more straight blades radiating from the curved portion, as described.

In witness whereof I hereunto set my hand and seal.

GEORGE W. STEVENS. [L. S.]

Witnesses:
JOHN L. BOONE,
C. M. RICHARDSON.